United States Patent [19]

Maxwell

[11] Patent Number: 4,508,773
[45] Date of Patent: Apr. 2, 1985

[54] PAPER PRODUCT AND GLUE THEREFOR

[75] Inventor: Gary A. Maxwell, Lisle, Ill.

[73] Assignee: Eschem Inc., Chicago, Ill.

[21] Appl. No.: 489,154

[22] Filed: Apr. 27, 1983

[51] Int. Cl.³ .................... B32B 27/14; B32B 9/06; C09J 5/02
[52] U.S. Cl. .................... 428/198; 106/125; 106/135; 106/137; 106/161; 156/308.4; 156/311; 156/336; 428/347; 428/478.8; 428/535
[58] Field of Search ............ 428/478.8, 535, 347, 428/198; 106/161, 125, 137, 135; 156/336, 308.4, 311; 430/451, 401

[56] References Cited

U.S. PATENT DOCUMENTS

| 1,015,365 | 1/1912 | Weelands et al. | 106/137 |
| 1,035,090 | 8/1912 | Hunter | 106/135 |
| 1,166,325 | 12/1915 | Church | 106/137 |
| 2,257,440 | 9/1941 | Wood | 430/401 |
| 2,726,162 | 12/1955 | Allen et al. | 106/125 |
| 2,899,327 | 8/1959 | Christopher et al. | 106/125 |
| 3,294,536 | 12/1966 | Baden et al. | 430/451 |
| 4,007,163 | 2/1977 | Habu et al. | 106/125 X |

FOREIGN PATENT DOCUMENTS

| 274490 | 7/1928 | United Kingdom . |
| 543302 | 2/1942 | United Kingdom . |
| 616210 | 1/1949 | United Kingdom . |
| 892633 | 3/1962 | United Kingdom . |
| 1064187 | 4/1967 | United Kingdom . |
| 1537685 | 1/1979 | United Kingdom . |
| 1580365 | 12/1980 | United Kingdom . |
| 2048987 | 12/1980 | United Kingdom . |

OTHER PUBLICATIONS

David J. Bak, "Foaming Action Improves Adhesive Performance", reprinted from Design News, May 26, 1980.

Primary Examiner—Thomas J. Herbert
Attorney, Agent, or Firm—Lockwood, Alex, Fitzgibbon & Cummings

[57] ABSTRACT

Paper products, such as wrapped rolls of newsprint, are provided wherein paper is bonded to paper by a glue formulation that is pumpable at elevated temperatures, which glue formulation includes animal glue, water and a water-soluble salt having an anion that is substantially divalent at the pH of the glue formulation. The paper product is prepared by heating the glue formulation and applying same at an elevated temperature.

37 Claims, 6 Drawing Figures

U.S. Patent     Apr. 2, 1985     4,508,773
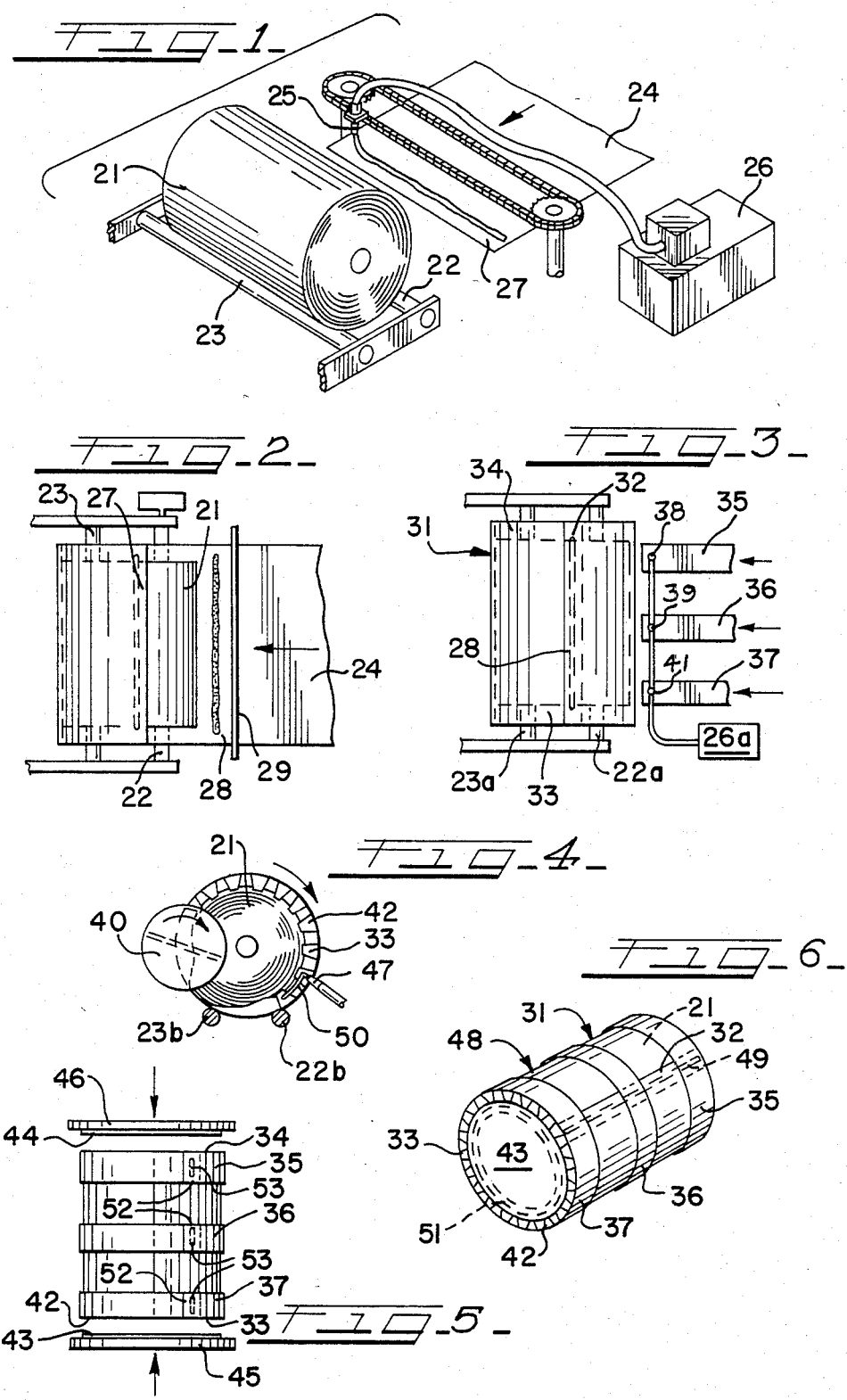

PAPER PRODUCT AND GLUE THEREFOR

BACKGROUND AND DESCRIPTION OF THE INVENTION

This invention generally relates to paper products as well as a method and glue formulation for making same. More particularly, this invention includes paper products that have portions thereof which are adhered to each other by a rapidly setting aqueous animal glue formulation that includes a salt component for enhancing the tack while maintaining a low viscosity, which formulation has an adequate pot life while setting within seconds when applied to the paper substrate. In an important aspect of this invention, the paper article is a roll of newsprint wrapped within a kraft paper cover that is glued together by an automated procedure.

When large rolls of newsprint paper are manufactured at pulp- and paper-making facilities, the rolls of newsprint thus produced are typically wrapped in protective kraft paper overcover shortly after the large newsprint rolls are made in order to thereby protect the rolls from becoming damaged and soiled during transport and storage. Each such paper overcovering is adhered to itself along appropriate seams such that the paper overcover generally conforms to the shape and size of the newsprint roll being wrapped. In this industry, it is important to accomplish this step of adhering the overcover together in a manner that is susceptible to automated and rapid handling.

In the past, these objectives were accomplished by utilizing pumpable hot melt adhesives to bond the overcover paper together along its seams. Hot melt adhesives are particularly suitable in this regard because they can be readily applied by devices that heat, pump and apply the adhesive to a directed location, such as by extruding. These types of adhesives are very suitable for use in these devices because they are flowable at temperatures above their melting points, typically on the order of 300° to 350° F. Such hot melt adhesives are applied in this flowable state and, after application, rapidly cool to a substantially solidified state at which they bond the roll wrapping cover over the roll of newsprint. Equipment for this procedure has been widely accepted in the paper-making industry, and hot melt adhesive application equipment of this type has been in wide use for a number of years.

One difficulty that has become increasingly more important over the years has been the fact that hot melt adhesives are primarily resins and polymers that are water-insoluble. Such hot melt adhesives must be used at somewhat high temperatures, they are difficult to clean from within applicator machinery, and they are more expensive than glues. Additionally, it is not possible to repulp the large paper overcovers after they have served their purpose of protecting the newsprint rolls. In the past, any attempted repulping of these overcovers would require special handling by removing that portion of the overcover having the hot melt adhesive adhered thereto or by carrying out some other special treatment procedure. Quite often, these roll wrapping overcovers would be discarded or incinerated, rather than being included within the repulping stock. This results in waste of a valuable natural resource.

Accordingly, there is a need for a new approach whereby the advantages of automated and rapid handling can be maintained while eliminating the undesirable effects that are attendant to the use of hot melt adhesives. It would be particularly desirable if this new approach would also maintain the use of the adhesive pumping and extruding equipment that is in wide use in this industry today.

The present invention achieves all of these objectives and advantages by devising an approach whereby a glue formulation having substantial quantities of animal protein glue is heated, pumped and applied, preferably by conventional hot melt adhesive applicators, to a paper article such as a newsprint roll overcover in order to adhere the paper article along a seam thereof. The glue formulation is a water-soluble blend of animal protein derived from a collagen, water, and a water-soluble salt which is divalent at the pH of the total system of the glue formulation. The salt, in combination with other components of the glue formulation, provides a glue formulation that is of enhanced tack and that is rapidly setting, while being pumpable at elevated temperatures lower than those typical of the application temperature of a hot melt adhesive.

It is accordingly an object of the present invention to provide an improved paper article, method of manufacture thereof, and glue formulation utilized therein.

Another object of the present invention is to utilize a glue formulation that is applied at elevated temperatures to cellulosic material, which glue formulation includes divalent anions to enhance its tack and shorten its setting time.

Another object of the present invention is to provide an improved paper article having portions adhered together by an animal based glue formulation that is extruded at an elevated temperature.

Another object of this invention is to provide an improved approach for wrapping newsprint rolls at the paper-making mill which utilizes currently used adhesive application equipment.

Another object of the present invention is to provide a roll-wrapping glue formulation which renders the wrapped roll completely repulpable.

Another object of this invention is to utilize a glue formulation applicator at temperatures lower than application temperatures of hot melt adhesives and in conjunction with a glue formulation that is more easily cleaned up and less costly than hot melt adhesives.

BRIEF DESCRIPTION OF THE DRAWING

These and other objects of the present invention will become apparent from the following detailed description and from the drawings, wherein:

FIG. 1 is a schematic perspective view illustrating a first stage of an apparatus for applying glue while automatically wrapping a roll of newsprint with an initial overlayer circumferential wrapping;

FIG. 2 is a schematic plan view of a subsequent step of the stage illustrated in FIG. 1;

FIG. 3 is a schematic plan view of a second stage of the apparatus for applying glue to affix circumferential reinforcing bands over the initial circumferential wrapping;

FIG. 4 is a schematic elevational view illustrating a third stage wherein overlapping edges of the paper overlayer are systematically folded onto the axial end faces of the newsprint roll and a circle of glue is applied thereover;

FIG. 5 is a schematic plan view of a fourth stage wherein paper end disks are adhered to the folded-over axial portions to which the glue has been applied; and FIG. 6 is a perspective view of a completed wrapped roll in accordance with this invention.

With reference to FIG. 1, a roll of newsprint 21, which typically weighs about one ton, is positioned on a pair of rollers, one of which may be a drive roller 22, and the other an idler roller 23. A web of overcover paper 24, typically kraft paper, is positioned for entry between the newsprint roll 21 and the drive roller 22, at which location a flow of glue formulation is deposited onto the web 24 generally along its leading edge 27, the glue formulation being delivered through an extruder head or nozzle 25 from an applicator 26.

The drive roller 22 feeds the web 24 between the roll 21 and the drive roller 22 and then between the roll 21 and the idler roller 23 until the web has substantially traversed the circumference of the roll 21, at which time the glue formulation is applied through a nozzle 25 along the entire width of the web 24. This feeding is continued until the leading edge 27 of the web 24 (which is glued to the roll 21) is overlapped by a trailing edge 28 of the roll 21, the trailing edge 28 being formed when the web 24 is cut by a suitable severance assembly 29. At this stage, a cylindrical initial wrap, generally designated as 31, is secured over the roll 21. The initial wrap 31 includes an axially directed seam 32 and overlapping ends 33 and 34 which actually extend beyond the axial ends of the roll 21.

As an optional feature, one or more reinforcing paper bands 35, 36, 37, may be adhered to the outside surface of the initial wrap 31 by a procedure similar to that illustrated in FIGS. 1 and 2, the glue formulation being directed by suitable extruder heads or nozzles 38, 39, 41 from a heated applicator 26a.

Next, the overlapping ends 33 and 34 are folded over, for example by a rotating disc 40, onto the axial ends of the roll 21 such that the overlapping end 33 is folded in a manner whereby sections 42 thereof are folded over onto one another in overlapping relationship relative to the respective axial ends of the roll 21.

In the procedure illustrated in FIG. 5, the respective axial ends of the roll 21 are covered with paper disks 43, 44 by suitable compression disks 45, 46. The paper disks 43 and 44 adhere to the overfolded overlapping ends 33 and 34, respectively, by virtue of the fact that heated glue formulation had been applied to the overlapping ends 33 and 34 after they were overfolded (see FIG. 4). Glue formulation application is effected by a suitable extruder head or nozzle 47 along a generally circular path 50. A similar extruder head or nozzle (not shown) is positioned at a similar location adjacent the other overfolded overlapping end 34.

The completed wrapped roll, generally designated as 48, is shown in FIG. 6. Completed wrapped roll 48 includes the now completely enclosed roll of newsprint 21, the cylindrical initial wrap 31, with its overfolded overlapping ends 33 and 34 being generally covered by the paper end disks 43 and 44. Also shown are the optional reinforcing bands 35, 36 and 37. The completed roll 48 is secured together by bands of repulpable glue formulation that were laid down in a heated, pumpable state, which laying down was effected by an apparatus such as the applicator 26 which heats and pumps the glue formulation through the various spray heads or nozzles. The applied glue formulation rapidly sets at the desired application locations by the time that the roll 21 proceeds to the next station.

In this manner, the completed wrapped roll 48 includes a plurality of repulpable and set glue formulation strips. Included are repulpable and set glue strip 49 located generally along the seam 32, as well as a generally circular repulpable and set glue formulation strip 51 that adheres the paper disk 43 to the axially overfolded overlapping end 33. A similar circular repulpable and set glue formulation strip (not shown) adheres the paper disk 44 to the axially overfolded overlapping end 34 of the cylindrical initial wrap 31. When one or more of the reinforcing bands 35, 36 and 37 are included, each will include a seam 52, at which a repulpable and set glue formulation strip 53 is located.

While the invention is particularly described herein in terms of the illustrated wrapped roll 48, the principals of the invention are suitable for application on other cellulosic articles, including other paper products, pressboard, and the like, upon which it would be advantageous to utilize a hot glue formulation having enhanced tack and setting properties that are characteristic of the glue formulation according to this invention.

Referring more particularly to the glue formulation utilized in connection with this invention, it is a rapidly setting glue formulation that is a water-soluble blend of animal protein derived from collagen, a water-soluble salt having divalent anions at the pH of the formulation, and water, preferably in combination with a polyol. Optional minor components may also be included, such as defoamers, antibacterial agents, corrosion inhibitors, chelating agents, scents, and the like. The glue formulations provide an excellent glue bond between cellulosic materials when applied at elevated temperatures on the order of 100° to 180° F., more typically between about 120° and 160° F., when utilized at an open time of about 8 seconds in conjunction with a compression time of about 4 seconds, which is illustrative of a controlled rapid setting time when compared with typical animal glue compositions that can have a setting time of up to a minute or more.

All of the components of the glue formulation are water-soluble at the concentrations at which each is included within the glue formulation, which typically includes about 30 to 60 weight percent of water, while including not more than approximately a total of 5 weight percent of miscellaneous minor components, both as based on the total weight of the glue formulation.

The animal glue component of the glue formulation according to this invention is partially hydrolyzed collagen that originates from bones, connective tissue, skin, or the like of slaughtered animals. The term "animal glue" as used herein may include sources of animal protein such as gelatin, bone glue, hide glue, or the like. These types of glues are characterized by their gel strength or Bloom strength which designate the strength of the gel when the animal glue component is formed into an aqueous gel.

Conventional animal glues, when used alone in aqueous solution to provide the setting rate needed for the high speed commercial operations to which this invention is directed, are of a viscosity that is much too high for use within conventional hot melt adhesive equipment such as the applicator 26. Accordingly, the amount of animal glue component included within the glue formulation of this invention is not more than about 40 weight percent, based upon the total weight of the composition, and typically greater than about 20 weight percent. The particular weight percent of animal glue components will vary somewhat depending upon the gel strength or Bloom strength of the animal glue or combination of animal glues utilized.

The glue formulation according to the present invention achieves suitable tack and rapid setting time while maintaining sufficient open time by including a tack enhancing agent which is a water-soluble salt that has an anion that is divalent at the pH of the particular glue formulation.

These salts may be inorganic or organic, and it is understood that the charge of the anion moieties of many salts is dependent upon the dissociation constants of the salt, which in turn are a function of the pH of the salt's environment. It is also to be understood that many salts will, at any given pH, include blends of anions at differing charges. It is accordingly understood that the term "divalent anion" when used herein is intended to include anion blends including substantial amounts of doubly charged ions when the particular salt is at the pH of the total composition or glue formulation. Also included are certain salts that will perform effectively as a suitable tack enhancing agent when they are at a pH at which the anion moiety includes anions that have three or four negative charges. Such salts are effective tackifying agents in accordance with this invention at these higher pH values, even though they may have a substantially reduced dianion content. Salts having such divalent or otherwise multiply charged anions are suitable for use as tack enhancing agents in accordance with this invention.

Examples of salts that are effective tack enhancing agents are alkaline metal, and/or magnesium, amine (ammonium, primary, secondary or tertiary) salts of sulfate ($SO_4^{--}$), hydrogen phosphate ($HPO_4^{--}$), phosphate ($PO_4^{---}$), dihydrogen pyrophospate ($H_2P_2O_7^{--}$), monohydrogen pyrophosphate ($HP_2O_7^{---}$), pyrophosphate ($P_2O_7^{----}$), pyrosulfate ($S_2O_7^{--}$), and silicate ($SiO_3^{--}$). Organic salts include salts of dicarboxylic acids, and derivatives thereof, saturated or unsaturated, such as citric, tartaric, phthalic, maleic, oxalic, and the like. On the whole, such salts are suitable tack enhancing agents within glue formulations according to this invention that are at a pH value between about 5.5 and 8.5, usually between about 6 and 7.5. Generally, a pH value above about 8.5 will hydrolyze the protein within the glue formulation.

Because of the diversity of multiple anion salts that are suitable for use in accordance with this invention, the concentration of such agents will necessarily vary depending upon the particular agent utilized. Generally speaking, the concentration of the tack enhancing agent will be an amount that is effective to provide the desired controlled rapid setting time. Such effective amount will be no less than about 1 weight percent, based upon the total weight of the glue formulation, up to the solubility limit of the particular tack enhancing agent within the glue formulation. The tack enhancing concentration will also be dependent upon its molecular weight when the concentration is expressed in terms of a weight percent. For example, divalent inorganic salts can vary at concentrations ranging between about 3 and about 20 weight percent, which is necessarily dependent upon such factors as the degree of water of hydration characteristic of the particular salt chosen.

Suitable plasticizing agents are those which will impart enhanced flexibility to the repulpable and set glue strips that are formed after the glue formulation has been applied and dried to its set, non-tacky gel structure. Suitable plasticizing agents include polyhydric alcohols and peptization agents, and they tend to extend the setting time of the glue formulation. Polyhydric alcohols include polyols that are particularly advantageous because they also increase the rate at which the dried and set glue strips are repulped. Suitable polyols include sorbitol, glycerine, sugars, and the like, while suitable peptization agents include urea, thiourea and sodium naphthalene sulfonate. Usually, the concentration of such plasticizing agents will be no greater than approximately 20 weight percent or more, based upon the total weight of the glue formulation.

The following specific examples will more precisely illustrate the invention and teach the procedures presently preferred for practicing the same, as well as the improvements and advantages realized thereby.

EXAMPLE I

Various animal glue compositions, Formulations A through G, were prepared, and certain properties thereof were determined and compared with the properties found to be especially desirable for use within applicators for hot melt adhesives, particularly as needed for preparing wrapped rolls of newspaper such as large rolls weighing on the order of 2,000 pounds. Each formulation was applied at a temperature of 140° F., and each was treated at an open time of 8 seconds, with a compression time of 4 seconds, such open time and compression time being characteristic of those times that are experienced in roll wrapping machinery of the type discussed herein. The most desirable formulations in this regard are those exhibiting a viscosity of between about 35 and 40 poise at 140° F. and that achieve an excellent bond of kraft paper to chip paper. Each fomula included, as basic components, 33 parts by weight of animal glue having a 300 gram Bloom strength, 12 parts by weight of industrial grade sorbitol, 1 part by weight of a defoamer, and 0.5 part by weight of a biocide.

Formulation A also included 40 parts by weight of water and no tack enhancing agent. The viscosity was only about 16 poise at 140° F., and the resultant bond was poor, no significant fiber tear being evident.

Formulation B included 37.4 parts by weight of water and 14 parts by weight of magnesium sulfate ($MgSO_4 \cdot 7H_2O$). The viscosity was about 37 poise at 140° F., and the resultant bond of kraft to chip was excellent, with fiber tear being evident.

Formulation C added to the basic components 45 parts by weight water and 4.5 parts by weight of sodium sulfate ($Na_2SO_4$). Viscosity measured at about 38 poise at 140° F., the resultant kraft to chip bond was excellent, and fiber tear was present.

Formulation D added 43 parts by weight of water and 6 parts by weight of sodium sulfate. In this instance, the additional tack enhancing agent when compared with Formulation C resulted in an excessively high initial viscosity of about 165 poise at 140° F. The formulation gelled too quickly and resulted in poor bond.

Formulation E added to the basic components 43 parts by weight of water and 6 parts by weight of ammonium sulfate. The initial viscosity was 40 poise at 140° F., and very high tack was observed. The resultant bond was judged to be good.

Formulation F omitted the defoamer and added 45 parts by weight of water and 6 parts by weight of sodium hypophosphate ($Na_2HPO_4$). The initial viscosity of this formulation was 125 poise at 140° F. Its gelling rate was excessive, and a poor bond resulted.

Formulation G omitted the defoamer and included 44 parts by weight of water and 10 parts by weight of disodium dihydrogen pyrophosphate ($Na_2H_2P_2O_7$). Initial viscosity was somewhat unstable, ranging between 30 and 60 poise at 140° F. The bond of kraft to chip was good, and some fiber tear was present.

Additional glue formulations not in accordance with this invention, but which were of substantially the same overall makeup as the other formulations of this example, were tested and found to actually increase the setting time of the overall formulation, rather than achieve the controlled rapid setting that is characteristic of this invention. These glue formulations, rather than having the "divalent anions" according to this invention, included salts of monovalent anions, including chlorides, bromides and nitrate.

EXAMPLE II

Various compositions, Formulations H through L, were prepared and tested for setting time in order to determine the maximum available open time for each formulation and to obtain an indication of the relative gel rates of the various formulations. A sample of each formulation was drawn down on a sheet of bond paper with a wire wound rod, each formulation being at 140° F. in its container. A stop watch was started as soon as the draw down was completed, and one-quarter inch strips of bond paper were placed on the exposed adhesive surface at 15-second time intervals, with the first strip having been placed down as soon as possible after starting the watch, this first strip being designated as the initial time period. Each such strip was placed and lightly rubbed down once with the fingers, after which it was immediately pulled back and checked to see whether or not it was well wetted by the exposed glue film.

The determination of adequate wetting is assisted by checking the tack strips and glue film under black light. Collagen floresces under black light, which is of assistance in estimating the amount of transfer onto the tack strips. When no transfer to the tack strip was observed, this indicated that the open time of the sample had been exceeded and that the film had gelled for the conditions of this test in order to provide a comparison of gel rates among the various formulations.

Each formulation included, as its basic components, 33 parts by weight of hide glue having a Bloom strength of 379 grams, as well as 67 parts by weight of water.

Formulation H, which included no tack enhancing agent according to this invention, exhibited substantially no setting (the film split evenly between the laid down sheet and the tack strips) through the 45 second interval, with partial gellation (the film adhered to the tack strip and partially pulled away from the laid down sheet, with the area lifted being between 25 and 75 percent) at the 60 second interval and at the 75 second interval. A gelled film (no transfer to the tack strip) was observed at 90 seconds. The viscosity of this formulation was about 40 poise at 140° F.

Formulation I added 6 parts by weight of magnesium sulfate to Formulation H, and the viscosity was found to be about 65 poise at 140° F. Partial gellation was first observed at 45 seconds and at 60 seconds for one of the samples, and a gelled film was observed at 75 seconds for one of the samples and at 60 seconds for the other sample.

Formulation J added 6 parts by weight of ammonium sulfate to Formulation H, and the viscosity was about 60 poise at 140° F. The first evidence of partial gellation ocurred at the 30-second interval, and completed gellation was observed at 60 seconds.

Formulation K added 6 parts by weight of sodium sulfate to Formulation H, the viscosity being about 90 poise at 140° F. Partial gellation was evident at the 30-second interval, and extensive partial gellation (film adhered to the tack strip and partially pulled away from the laid down sheet, with the area lifted being less than 25 percent) at 45 seconds. Complete gellation was observed at 60 seconds.

Formulation L incorporated 6 parts by weight of sodium hypophosphate to Formulation H, and the viscosity was measured at about 130 poise at 140° F. Partial gellation was evident at 30 seconds. One of the samples was gelled at 45 seconds, while the other one exhibited extensive partial gellation at 45 seconds and complete gellation at 60 seconds.

EXAMPLE III

A glue formulation was prepared which included 220 grams water, 60 grams of sorbitol, 165 grams of a blend of bone glue and hide glue, 2.5 grams of a preservative, and 30 grams of potassium citrate, $HOC(COOK)(CH_2OOK) \cdot H_2O$. This formulation, which included approximately 6 percent of the organic tack enhancing agent, exhibited moderate tack. Additional potassium citrate was added to a level of approximately 10 weight percent potassium citrate based upon the total weight of the composition, and the resultant glue formulation was found to be overly viscous, being 140 poise at 140° F. The formulation including 6 weight percent potassium citrate was found to be generally acceptable at a pH of between about 5.5 and 8.5. A pH above 8.5 was found to hydrolyze the protein in the formulation.

EXAMPLE IV

A formulation substantially the same as that of Example III was prepared, except the potassium citrate was replaced with approximately 6 weight percent of sodium tartrate ($Na_2C_4H_4O_6 \cdot 2H_2O$). This formulation provided tack properties that were judged to be good, and they were acceptable for use within a hot melt adhesive applicator to provide the degree of open time and adhesion needed for roll wrapping.

While in the foregoing specification, certain embodiments and examples of this invention have been described in detail, it will be appreciated that modifications and variations therefrom will be apparent to those skilled in the art; accordingly, this invention is to be limited only by the scope of the appended claims.

What is claimed is:

1. A cellulosic article having portions thereof adhered to each other, comprising the portions being adhered together by a rapidly setting, aqueous protein-based animal glue formulation that is set as a glue strip of the cellulosic article, said glue formulation being a water-soluble blend of:
(a) between about 20 and about 40 weight percent, based on total weight of the formulation, of an animal protein component derived from collagen,
(b) water, and (c) a tack enhancing agent which is a water soluble inorganic salt;

said water soluble inorganic salt including an anion that is divalent at the pH value of the glue formulation, said divalent anion being present in the glue formulation at a concentration that is effective to provide a controlled rapid setting time, up to the solubility limit of the soluble salt within the glue formulation; and said set glue strip having been formed by controlled rapid setting of said glue formulation that had been applied to the cellulosic article at an elevated temperature greater than room temmperature;

said set glue strip had been applied at a temperature between about 100° and about 180° F.

2. The article of claim 1, wherein said glue formulation further includes a chelating agent.

3. The article of clam 1, wherein said glue formulation has a viscosity of between about 25 and 60 poise at 140° F.

4. The article of claim 1, wherein said glue formulation includes between about 30 and about 60 weight percent of water, based on the total weight of the glue formulation.

5. The article of claim 1, wherein said glue formulation further includes a corrosion inhibitor.

6. The article of claim 1, wherein said soluble salt is an inorganic salt having an anion including phosphorus or sulfur.

7. The article of claim 1, wherein said glue formulation has a pH value of between about 5.5 and about 8.5.

8. The article of claim 1, wherein said glue formulation further includes up to about 20 weight percent of a plasticizing agent, based upon the total weight of the glue formulation.

9. The article of claim 1, wherein said glue formulation has a viscosity of between about 5 to 80 poise at 140° F.

10. The article of claim 1, wherein said glue formulation has a viscosity of at least 5 poise at 140° F.

11. In a roll of newsprint wrapped within an overcover in general conformity with the shape and size of the roll of newsprint, the overcover being adhered together by a formulation that had been heated and pumped to an adherence location on the overcover and that had been allowed to cool and set at the adherence location, wherein the improvement comprises:

the formulation is a rapidly setting, aqueous protein-based animal glue formulation, said glue formulation being a water-soluble blend of: (a) between about 20 and about 40 weight percent, based on the total weight of the formulation, of animal protein derived from collagen, (b) water, and (c) a tack enhancing agent which is an inorganic salt that is soluble within the glue formulation;

said soluble salt includes an anion that is divalent at the pH value of the glue formulation, said divalent anion being present in the blend at a concentration that is effective to provide a controlled rapid setting time, up to the solubility limit of the soluble salt within the glue formulation;

said set glue formulation at said adherence location and said overcover are both repulpable; and said set glue formulation at said adherence location had been applied at a temperature between about 100° and about 180° F.

12. The improved roll of claim 11, wherein the overcover is kraft paper.

13. The improved roll of claim 11, wherein the overcover includes a generally cylindrical initial wrap having overlapping ends which overlie a peripheral portion of each axial end of the roll of newsprint, the overcover further including a paper disk that overlies each respective axial end and that is adhered to a portion of said respective overlapping ends.

14. The improved roll of claim 11, wherein said glue formulation includes between about 30 and about 60 weight percent water and between 0 and about 20 weight percent of a polyhydric alcohol.

15. The improved roll of claim 11, wherein said adherence location had been applied from said glue formulation having a viscosity of between about 25 and 60 poise at 140° F.

16. The improved roll of claim 11, wherein said adherence location had been applied from said glue formulation having a viscosity of between about 5 to 80 poise at 140° F.

17. The improved roll of claim 11, wherein said glue formulation further includes a chelating agent.

18. The improved roll of claim 11, wherein said glue formulation further includes a corrosion inhibitor.

19. A rapidly setting, protein-based glue formulation comprising a water-soluble blend of:
(a) between about 20 and about 40 weight percent, based on the total weight of the glue formulation, of an animal protein component that is derived from collagen,
(b) between about 30 and about 60 weight percent water, based on the total weight of the glue formulation, and
(c) between about 3 and about 20 weight percent of a tack enhancing agent, based on the total weight of the glue formulation, which is a water soluble inorganic salt including an anion that is divalent at the pH value of the glue formulation, said divalent anion being present in the glue formulation at a concentration that is effective to provide a controlled rapid setting time, up to the solubility limit of the soluble salt within the glue formulation;

said rapidly setting, protein-based glue composition is pumpable and able to be applied to and adhered to a cellulosic substrate when the glue composition is heated at elevated temperature between about 100° and about 180° F.; and said rapidly setting, protein-based glue composition is repulpable when set onto a cellulosic article.

20. The glue formulation of claim 19, further including a chelating agent.

21. The glue formulation of claim 19, wherein said glue formulation is characterized by having a viscosity of at least about 5 poise at 140° F.

22. The glue formulation of claim 19, further including a corrosion inhibitor.

23. The glue formulation of claim 19, wherein said soluble salt is an inorganic salt having an anion including phosphorus or sulfur.

24. The glue formulation of claim 19, wherein said blend has a pH value of between about 5.5 and 8.5.

25. The glue formulation of claim 19, wherein said blend further includes up to about 20 weight percent of a plasticizing agent, based upon the total weight of the glue formulation.

26. A method for adhering cellulosic articles, comprising the steps of:

selecting a cellulosic article having portions thereof to be adhered together;

blending together a glue formulation that is a water soluble blend of: (a) between about 20 and about 40 weight percent, based on the total weight of the formulation, of an animal protein component derived from collagen, (b) water, and (c) a tack enhancing agent which is a water soluble inorganic salt, said soluble salt including an anion that is divalent at the pH of the glue formulation, said divalent anion being present in the water soluble blend at a concentration that is effective to provide a controlled rapid setting time, up to the solubility limit of the salt within the glue formulation;

heating said glue formulation to an elevated temperature between about 100° and about 180° F.; and applying said heated glue formulation onto a cellulosic article so as to form a set glue strip on the cellulosic article, said set strip being water soluble, said applying step including controlled rapid setting thereof.

27. The method of claim 26, wherein said glue formulation further includes a chelating agent.

28. The method of claim 26, wherein said glue formulation further includes a corrosion inhibitor.

29. The method of claim 26, wherein, during said applying step, said glue formulation has a viscosity of at least about 5 poise at 140° F.

30. The method of claim 26, wherein said applying step includes pumping said heated glue formulation.

31. The method of claim 26, further including maintaining the pH value of the glue formulation at between about 5.5 and about 8.5.

32. The method of claim 26, wherein said cellulosic article is an overcovering that is in general conformity with the size and shape of a roll of newsprint.

33. The method of claim 32, wherein, during said applying step, said glue formulation has a viscosity of between about 5 and about 80 poise at 140° F.

34. The method of claim 32, wherein, during said applying step, said glue formulation has a viscosity of between about 25 and about 60 poise at 140° F.

35. A method for adhering and repulping cellulosic articles, comprising the steps of:

selecting a cellulosic article having portions thereof to be adhered together;

blending together a glue formulation that is a water soluble blend of: (a) between about 20 and about 40 weight percent, based on the total weight of the formulation, of an animal protein component derived from collagen, (b) water, and (c) a tack enhancing agent which is a water soluble inorganic salt, said soluble salt including an anion that is divalent at the pH of the glue formulation, said divalent anion being present in the water soluble blend at a concentration that is effective to provide a controlled rapid setting time, up to the solubility limit of the salt within the glue formulation;

heating said glue formulation to an elevated temperature between about 100° and about 180° F.;

applying said heated glue formulation onto a cellulosic article so as to form a set glue strip on the cellulosic article, said glue strip being water soluble, said applying step including controlled rapid setting thereof; and repulping said cellulosic article and said set glue strip.

36. The adhering and repulping method of claim 35, wherein said glue formulation further includes a chelating agent.

37. The adhering and repulping method of claim 35, wherein said glue formulation further includes a corrosion inhibitor.

* * * * *

UNITED STATES PATENT AND TRADEMARK OFFICE
CERTIFICATE OF CORRECTION

PATENT NO. : 4,508,773
DATED : April 2, 1985
INVENTOR(S) : Gary A. Maxwell

It is certified that error appears in the above-identified patent and that said Letters Patent are hereby corrected as shown below:

Column 1, lines 20 and 21, "in protective" should read --in a protective--.
Column 5, line 34, "phosphate ($PO_k$---)," should read --phosphate ($PO_4$---),--; line 56, "enhancing concentration" should read --enhancing agent concentration--.
Column 8, line 2, "ocurred" should read --occurred--.
Column 9, line 11, "clam" should read --claim--.
Column 11, line 10, "set strip" should read --set glue strip--.

Signed and Sealed this

Third Day of December 1985

[SEAL]

Attest:

DONALD J. QUIGG

Attesting Officer    Commissioner of Patents and Trademarks